M. F. J. GERSTENHÖFER.
Apparatus for the Manufacture of Sodium Carbonate.
No. 240,995.　　　　　　　　　Patented May 3, 1881.
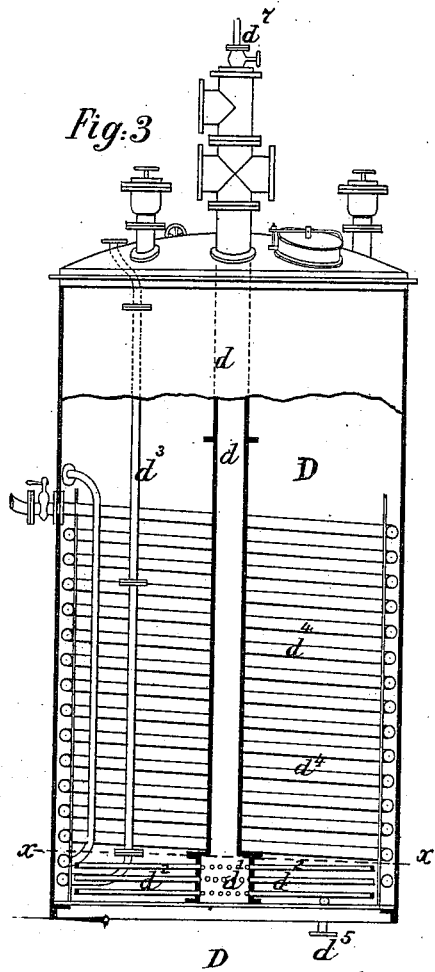
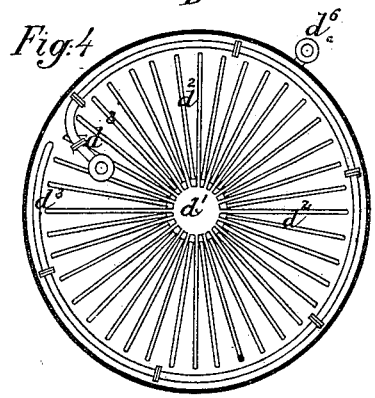
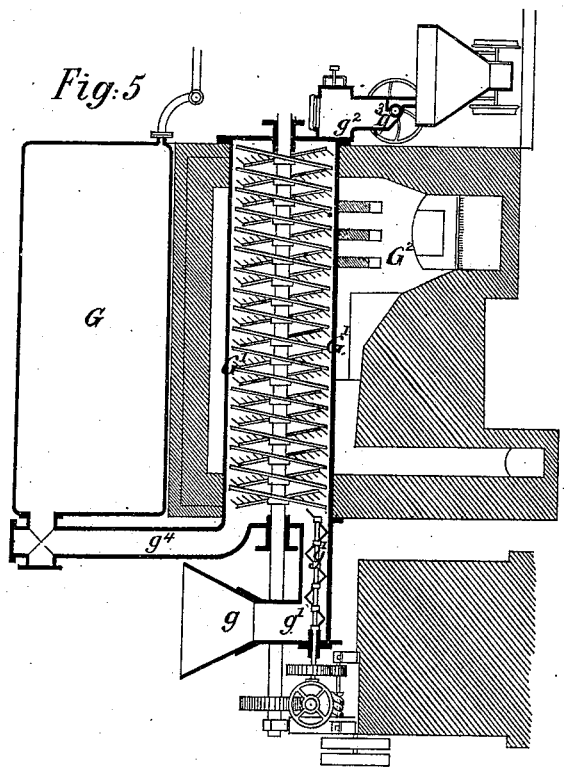

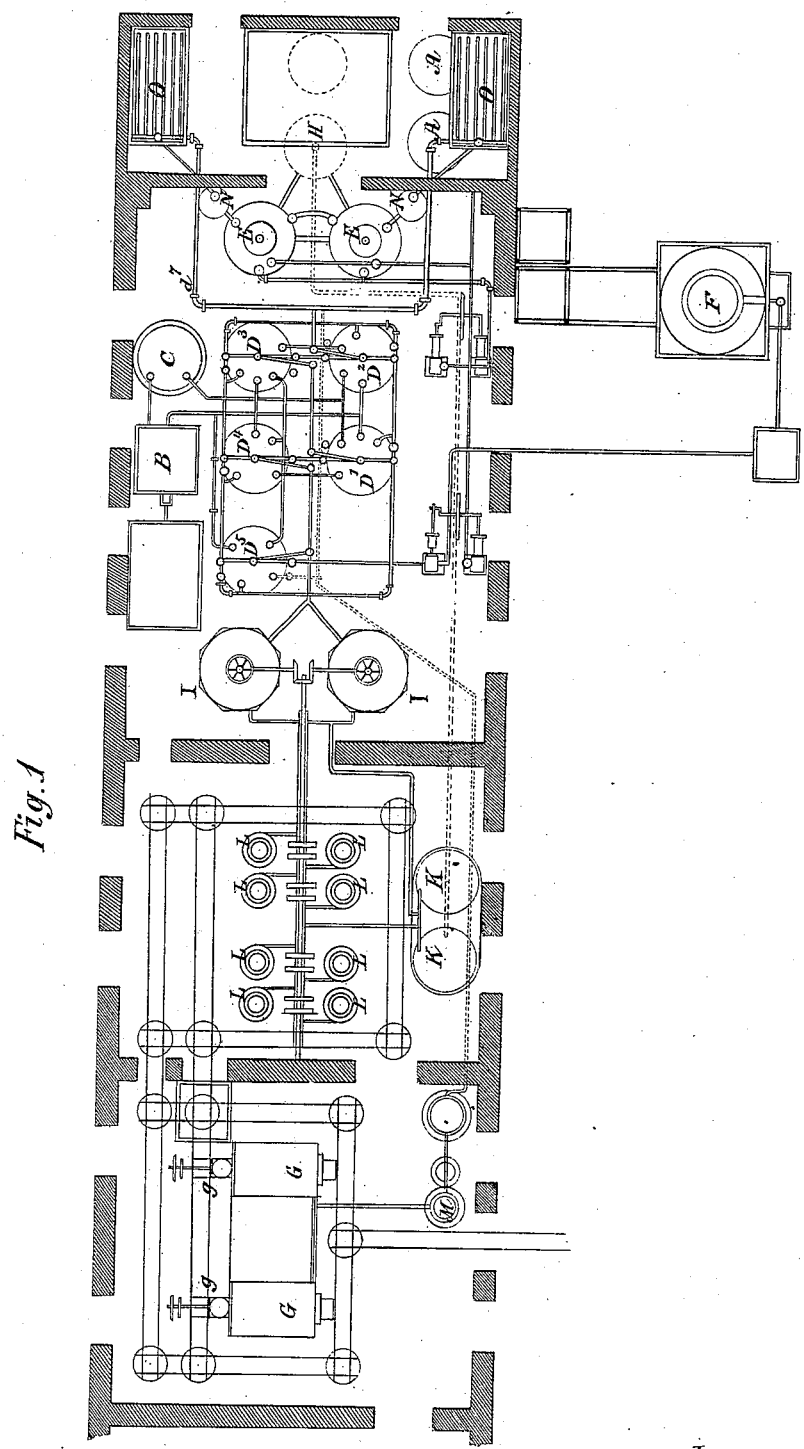

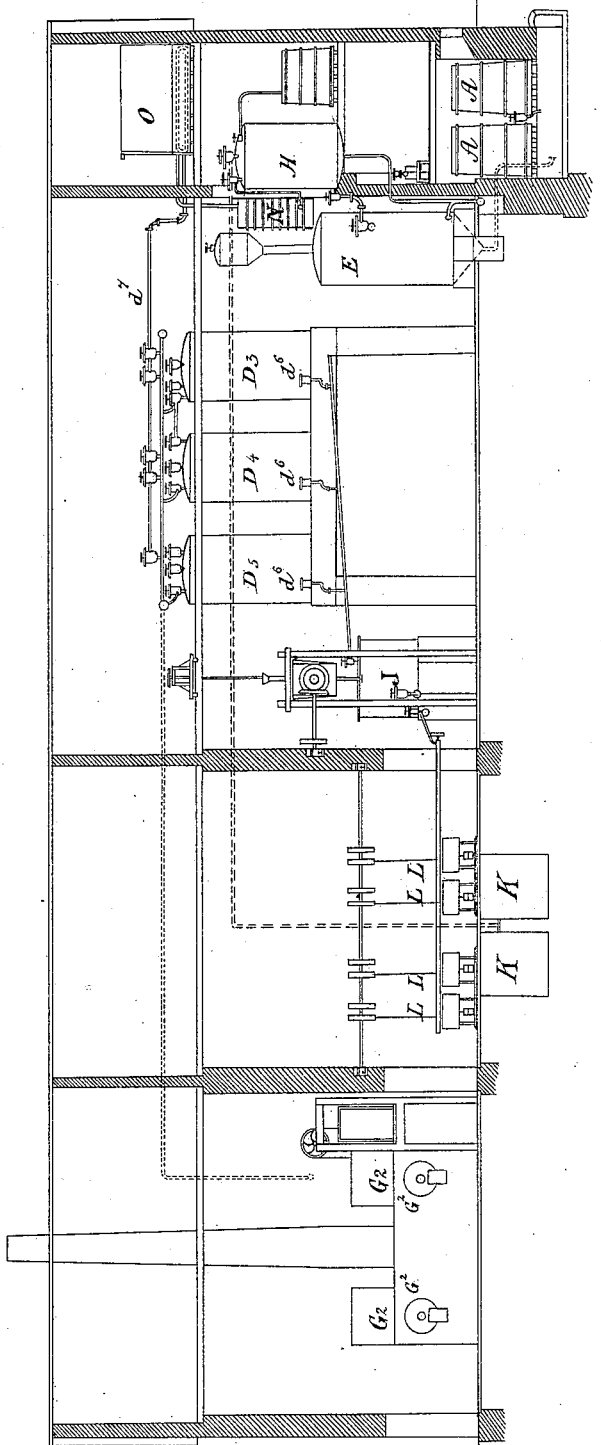

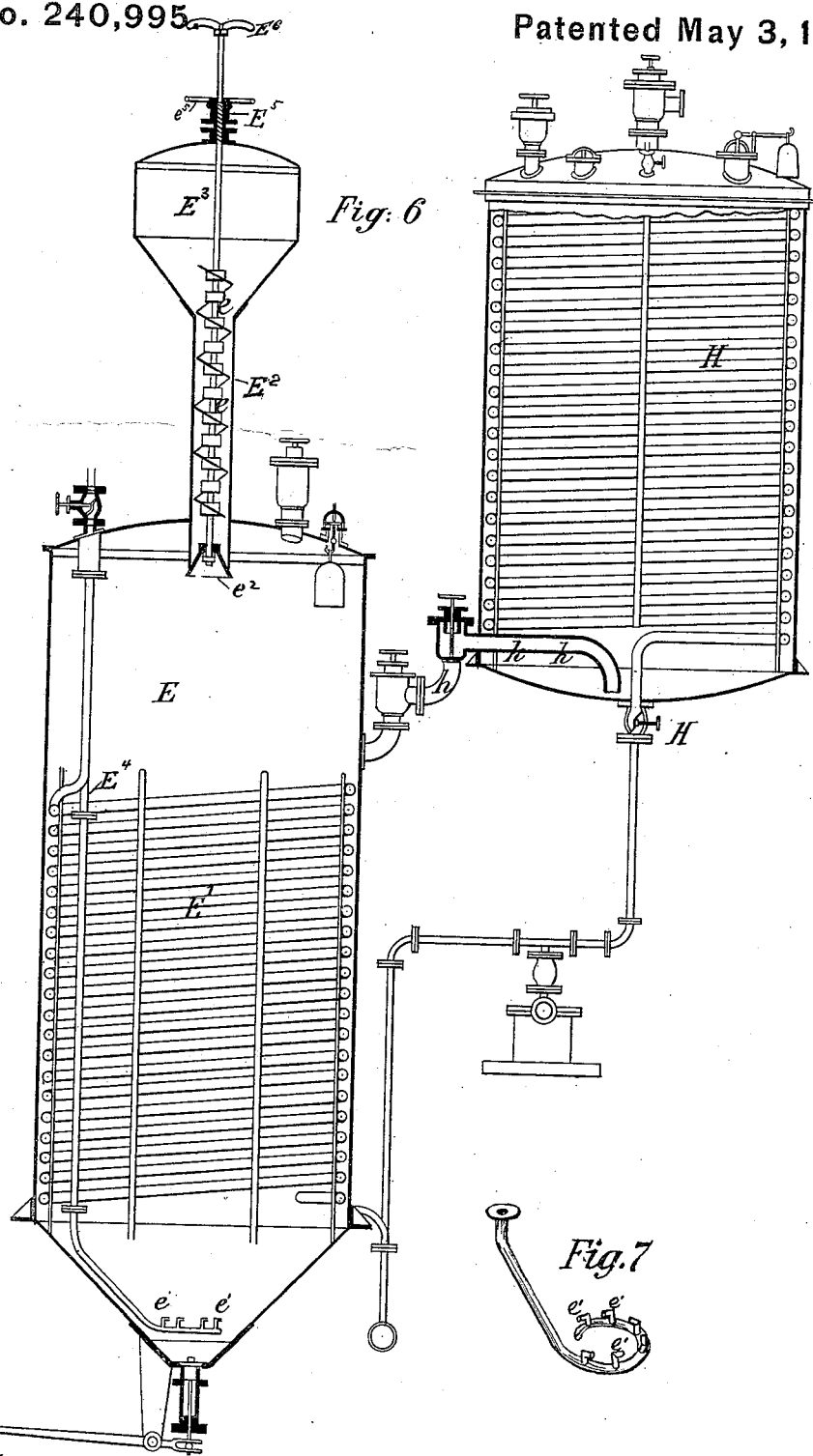

UNITED STATES PATENT OFFICE.

MORITZ F. J. GERSTENHÖFER, OF FRIEDEBURG, NEAR FREIBERG, SAXONY, GERMANY.

APPARATUS FOR THE MANUFACTURE OF SODIUM CARBONATE.

SPECIFICATION forming part of Letters Patent No. 240,995, dated May 3, 1881.

Application filed October 29, 1879.

*To all whom it may concern:*

Be it known that I, MORITZ FLORIAN JOSEPH GERSTENHÖFER, of Friedeburg, near Freiberg, in the Kingdom of Saxony, German Empire, have invented a new and useful Improvement in Apparatus for the Manufacture of Soda by the so-called "Ammonia-Soda Process," of which the following is a specification.

It is known that if a pure solution of salt brine is thoroughly mixed with bicarbonate of ammonia in solution, or if ammonia and carbonic-acid gas are used alternately in such a solution, the results of the chemical reactions produced are bicarbonate of soda and chloride of ammonia. The former is nearly insoluble in the liquor of the latter, and is therefore separable. The ammonia can then be recovered.

The object of my invention is to produce monocarbonate of soda, and avoid, as nearly as possible, the loss of ammonia in the process of manufacture; and the improvement consists in the improved construction of apparatus, and in the combination and relative arrangement of apparatus, whereby the process is conducted in an uninterrupted series of operations in air-tight vessels, and connected together in such manner that the excess of ammonia may be used over and over again during the continuation of the process.

In the accompanying drawings, Figure 1 is a horizontal section through a building and my apparatus located therein. Fig. 2 is a vertical longitudinal section with the apparatus in elevation, showing their combination, arrangement, and connection. Fig. 3 is an enlarged vertical sectional view of one of the universal apparatus detached; Fig. 4, a horizontal section of the base of the same in the line $x\ x$ of Fig. 3; Fig. 5, a detached vertical longitudinal section through the calcining apparatus; Fig. 6, a vertical section through the heater and still connected with each other, as hereinafter described. Fig. 7 is a perspective view of the coiled pipe and tangential jets located in the still, showing such pipe and jets detached.

As represented in the ground plan, Fig. 2, and elevation, Fig. 1, the plant consists, mainly, of a brine-tank, A, from which the brine is forced over to a coke-tower, B, preferably supplied at the top with a shower apparatus, by which the brine is distributed over a large area. The wasted ammonia-gas, if any should leave the next apparatus, passes upward in this tower and is absorbed entirely by the brine. The latter is collected at the bottom of the tower in a reservoir, C, and is then pumped into the universal apparatus D. There are five of the universal apparatus used alternately for a fourfold purpose. Each consists of an air-tight cylindrical sheet-iron vessel, D, nearly twice as high as its diameter, as shown in Figs. 3 and 4 on a large scale. It is supplied with a three-way pipe, $a$, the top branch of which passes through the center to the bottom of the cylinder, where it connects with a wider cylinder, $d$. In this cylinder are screwed a large number of small perforated pipes, $d^2$, closed at the end and placed in radial position, reaching not quite to the circumference of the cylinder. The ammonia-gas from a still, E, and the carbonic-acid gas received from a lime-kiln, F, are alternately forced through these pipes after the cylinder has been charged with brine from the coke-tower, according to the opening or closing of the respective valves.

The universal apparatus has another pipe, $d^3$, passing through the top down to the bottom and curled around the bottom in one coil, that part of the pipe being also perforated. Through this pipe the carbonic-acid gas from a calcining-cylinder, G, Figs. 1 and 2, and a heater, H, is passed through the brine.

Around the circumference on the inside of the cylinder of the universal apparatus is a closely-coiled pipe, $d^4$, used as a refrigerator to reduce the temperature produced by the chemical reaction.

Six valves in the top of each apparatus and near its connecting-pipes permit the gases to enter or escape, as need be, through the series of pipes connected with the other universal apparatus, according to the period required for each apparatus. A pipe, $d^5$, and cock $d^6$ near the bottom allow the contents to be discharged to the stirring apparatus I I.

A suitable steam-pipe permits steam to be introduced to clean the apparatus after its various duties have been performed. A manhole also gives access to the apparatus inside, and safety-valves guard against overpressure.

Five of the universal apparatus are preferably used, and are represented by $D'$ $D^2$ $D^3$ $D^4$ $D^5$ in Figs. 1, 2, 3, and 4.

The operation of this universal apparatus is as follows: At the beginning of the operation four of the compartments, $D$ $D^2$ $D^3$ $D^4$, are filled with brine which has absorbed the last waste gases from the coke-tower, and consequently contain salt brine containing small quantities of carbonate of ammonia, or, probably, sometimes a little excess of either gas, ammonia, or carbonic acid. The operation then is divided into successive periods.

In the first period the first cylinder, $D'$, receives ammonia-gas and sufficient carbonic-acid gas to form monocarbonate of ammonia, which, with the brine, forms the contents of the compartment. The second and third compartments or cylinders, $D^2$ and $D^3$, act as absorbers for waste gases of the same character, and contain, therefore, principally brine and some gases or carbonate of ammonia. The fourth compartment, $D^4$, contains only brine.

In the second period the first compartment, $D'$, receives the balance of carbonic-acid gas to produce bicarbonate of ammonia, which, by reaction on the brine, produces bicarbonate of soda and chloride of ammonia; the second compartment, $D^2$, receives ammonia-gas and sufficient carbonic acid to form monocarbonate of ammonia, as in first period; the third and fourth compartments act as absorbers of waste gases, and their contents are like those of the second and third cylinders in the first period. The fifth compartment, $D^5$, is now charged with brine.

In the third period the first compartment, $D'$, is emptied and cleaned, the second compartment, $D^2$, receives the balance of carbonic-acid gas to form bicarbonate of ammonia, and the same reaction as in first compartment takes place, while the third compartment now acts as absorber of ammonia and carbonic-acid gas, and therefore its contents are the same as the preceding compartment in the preceding period. The fourth and fifth compartments act now as receivers of waste gases, the fifth having previously been charged with brine, as stated.

In the fourth period the third compartment receives its balance of carbonic-acid gas to form bicarbonate of ammonia, the succeeding compartments acting as did their immediate predecessors in the preceding period, and so on, until all the compartments have contained, in succession, first brine and a small quantity of waste gases and monocarbonate of ammonia, next bicarbonate of soda and chloride of ammonia, these last contents being discharged from each compartment to the agitators I through pipes $d^5$, and the compartment, after being cleaned, is charged with fresh brine to recommence the operation.

The agitators are each formed of a cylindrical tube with an air-tight top, through the stuffing-box of which a vertical shaft enters the tube. This shaft is provided with a number of arms to agitate the liquor received from the universal apparatus, and if need be produce a still more perfect chemical reaction. After it has settled a portion of the solution, consisting of chloride of ammonia, &c., is discharged through the pipes into the pressure-tank K, and from thence to the heater H. The precipitate, with the balance of the liquor, is transported through a closed trough provided with a feed-screw into the centrifugal machines L L, eight of which are employed. Here, by centrifugal force, the precipitate of bicarbonate of soda is entirely separated from the liquor, which is also run to the pressure-tank K, mentioned before. The contents of the pressure-tank are discharged therefrom by the direct application of steam or compressed air above the surface of the liquid, and may be raised to any required height. This simple means may be employed in any part of the apparatus where it is required to raise a liquid from a lower to a higher elevation.

The bicarbonate from the centrifugal machines is discharged into closed tubes and transported to the hopper $g$ of the calcining apparatus. This apparatus is shown upon a large scale in Fig. 5, and consists of a long horizontal iron cylinder, G, through the center of which passes a shaft, kept tight by stuffing-boxes. This shaft is provided with segments to propel and rakes to mix the bicarbonate intimately while it is carried from the rear to the front of the cylinder. At the rear end another smaller feed-screw, $g$, is buried in the bicarbonate contained in the hopper, which delivers the same into the cylinder. At the front end of the cylinder the bicarbonate, being now converted into monocarbonate of soda, is delivered into another closed hopper, $g^2$, from which, by means of a fluted roller, $g^3$, working in close contact up to the bottom and rear of the hopper, so much of the material is discharged as will be inclosed between the grooves of the roller, thus preventing the air from entering the calcining apparatus. The whole cylinder is placed inside of a furnace, $G^2$, and by heat the carbonic-acid gas is expelled. This passes first by pipe $g^4$, from which it is exhausted, into a refrigerator, M, and by pressure from a pressure-tank, K, is forced back into the universal apparatus to be used over again. The monocarbonate discharged passes a pair of rollers, which prepare it for packing.

The chloride of ammonia, which contains also a portion of bicarbonate of ammonia, is treated in a still. This consists of a primary heater, H, which is an iron boiler provided with a steam-worm and an automatic condenser at the bottom. Here, by proper temperature, all the carbonic acid is first expelled, and enters at once the universal apparatus. At the proper time the liquor is discharged by pipe $h$ into the main still. This consists, also, of an iron cylinder, E, conical at the bottom, provided with a vertical feed-screw, $e$, at the top, to charge the caustic lime, which screw is carried by a vertical rod turning in a feed-cylinder, $E^2$, and provided with a conical valve, $e^2$, at its bottom, and a screw-thread near its top, and passing through a screw-threaded aperture in the top of the chamber $E^3$, whereby the feed-cylinder may be closed when the cylinder $E^2$ is charged, to prevent the escape of gas. When the screw is used for feeding the rod is run down so that its screw-thread escapes from the threaded passage at the top of the still, the head $E^6$ rests upon the collar $E^5$, and the screw may then be turned freely. When the valve is to be closed the rod is drawn up and turned to engage the rod in its screw-thread, in which it may be screwed up to tightly close the valve.

The still contains a steam-worm, E', and a pipe, $E^4$, which is coiled at its lower end, and is provided with a number of right-angled nozzles, $e'$, set upright and tangentially to the coiled end of the pipe, so as to discharge tangential jets, whereby a circular motion is imparted to the liquor to prevent the formation or collection of sediment. The chloride of ammonia is here decomposed and the ammonia volatilized, which, after passing a rectificator, N, and a dephlegmator, O, to be concentrated and dried, is forced back into the universal apparatus by the pipe $d^7$, to take its place again in a new turn.

What I claim is—

1. In an apparatus for the manufacture of monocarbonate of soda, the combination of the brine-tank A, the coke-tower B, the reservoir C, the universal apparatus D, and the ammonia and carbonic-acid generators, connected by suitable pipes having air-tight connections, the whole constructed and arranged to operate substantially as and for the purposes specified.

2. In combination with the brine-tank, coke-tower, reservoir, universal apparatus, and the ammonia and carbonic-acid generators, the agitators I, suitable pipes for connecting the latter with said universal apparatus, the pressure-tanks K, and pipes for connecting with the said agitators and the centrifugal machines L, and pipes for connecting the latter with said pressure-tanks, whereby the said agitators are adapted to receive the precipitate from the generator for the purpose of mixing it more thoroughly with and then draining off most of the chloride of ammonia liquor from the same, substantially as specified.

3. In combination with the brine-tank, coke-tower, reservoir, and universal apparatus, and the ammonia and carbonic-acid gas generators, the agitators and pressure-tanks K, the latter being connected by suitable pipes and air-tight connections with the primary heater H, whereby the chloride of ammonia formed, and any carbonic acid contained in solution therein, may be transferred to the heater H, wherein the carbonic acid and chloride of ammonia are separated for further use, substantially as specified.

4. In combination with the brine-tank, coke-tower, reservoir, and universal apparatus, and the agitators, pressure-tanks K, and centrifugal machines L, the calcining apparatus to receive the bicarbonate of soda, leaving the centrifugal machine for the purpose of calcining said bicarbonate and converting it into monocarbonate of soda, substantially as described.

5. In an apparatus for the manufacture of monocarbonate of soda, the combination, with the still E, of the feeding apparatus consisting of the cylinder $E^2$, inclosed vessel $E^3$, and feed-screw $e$, operated by a rod extending through the wall of said inclosed vessel, substantially as described.

6. The combination, with the still, of the branch pipe extending within said still to near the bottom thereof, and terminating in a coiled portion provided with a number of projecting nozzles, $e'$, bent at right angles to discharge tangential jets, whereby a rapid circular motion is imparted to the liquor to prevent a collection of sediment at the bottom of the still.

7. In combination with the retort G' and its feed mechanism, the chamber G and air-tight discharge mechanism, consisting of the inclosed hopper $g^2$ and the fluted roller $g^3$, working in close contact with the wall of said hopper on each side of its discharge-opening, and adapted to operate substantially as and for the purposes specified.

MORITZ FLORIAN JOSEPH GERSTENHÖFER.

Witnesses:
RECHTSAAWALT ULRICH HEISTERBERGK,
BERGRAFT CLEMENT WINKLER.